United States Patent Office 3,298,227
Patented Jan. 17, 1967

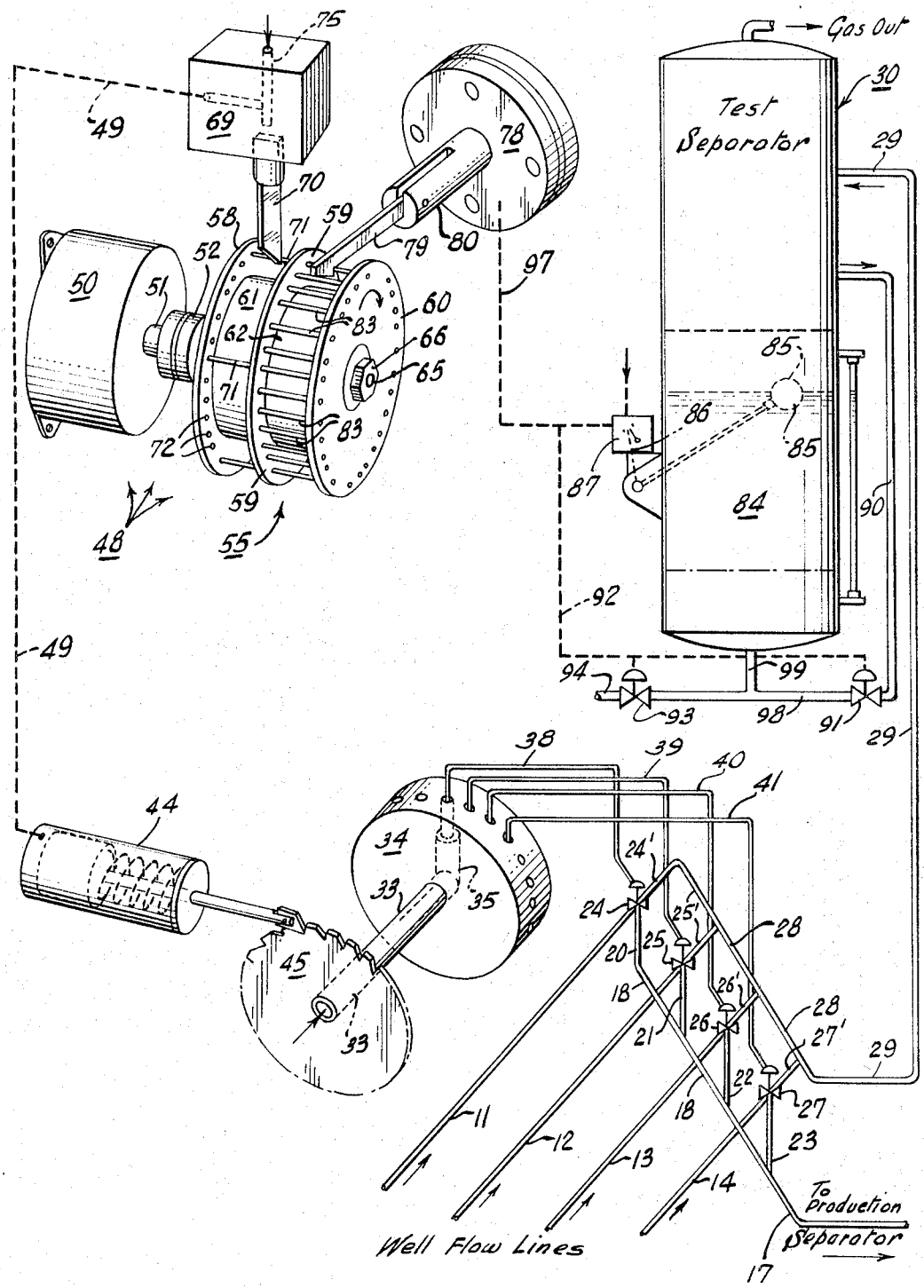

3,298,227
SEMI-AUTOMATIC WELL TESTING SYSTEM
Norman W. Hicks, Caracas, Venezuela, assignor to Texas Petroleum Company, New York, N.Y., a corporation of New Jersey
Filed Aug. 26, 1963, Ser. No. 304,521
7 Claims. (Cl. 73—155)

This invention concerns well testing, in general, and more specifically relates to a system that is particularly applicable to plural-well oil fields. In particular, the invention concerns a semi-automatic well testing system that provides for improvements over prior known arrangements.

Heretofore in oil fields, where there were a plurality of producing wells and where it was desired to set up a program for testing all of the wells in the field in order to obtain data regarding characteristics of each well, the arrangement for doing so was basically a time controlled program. Under such an arrangement the period of time for which a given well was tested had to be predetermined and, until manually reset, such period remained unchanged and was the same for all of any given group of wells being tested. For this reason, the test programmer had to be set up for a test period sufficiently long to obtain an accurate test on the lowest volume producing wells. By reason of this fact, the higher production rate wells were subjected to tests for considerably longer period of time than was necessary and a lot of time was wasted in running a test for the entire group of wells.

Consequently, it is an object of this invention to provide a system that will assure an ample test period for each well based on both the producing characteristics of the well and on time, so that a relatively short test period will result for high producing wells while an extended time period is provided for low volume producers.

In accordance with this invention, the desired results indicated may be accomplished by arbitrarily selecting a given number of cycles of a metering vessel as being an adequate quantity of produced fluid to provide the necessary well test. Then, by selecting an adequate period of time to obtain sufficient testing of the lowest producing wells, the combined time and quantity control arrangement will switch from one well to the next in the test sequence, depending upon which comes first, the time period or the given number of metering cycles.

Another object of this invention is to provide in a semi-automatic well testing system, the benefit to be gained from a predetermined maximum quantity of test fluid. Such arrangement means that the test sample pump which draws off a sample from the test fluid, may be set for a given speed of operation without any possible overflow of the sample bottle.

Another object of this invention is to provide a time driven control signal instrument, which has in addition to the time drive a means for introducing override in response to some other function.

Briefly, the invention relates to semi-automatic well testing wherein a plurality of producing wells are connected so as to provide for testing the production of individual wells, in a predetermined sequence. The invention comprises in combination a time means for controlling the switching from one well to the next in said sequence, following a predetermined time interval. And it comprises means for automatically controlling the switching from one well to the next upon measurement of a predetermined quantity of production from the well under test if said quantity measurement is completed prior to the termination of said predetermined time interval.

Again briefly, the invention relates to an improvement for a combination that includes a semi-automatic well testing system in which the system comprises a plurality of flowing lines for carrying production fluids from a plurality of wells corresponding thereto, and a first manifold for carrying said fluids to a production separator. The system also comprises a second manifold for carrying said fluids to a test separator, and a volume measuring means for the test fluid from said second manifold. In addition, the system comprises a plurality of three-way valves corresponding to said flow lines, for alternatively connecting each flow line to said first or said second manifold. Also, the system comprises a time controlled means for actuating said three-way valves in sequence after a predetermined constant time interval. The invention particularly relates to the improvement for a semi-automatic well testing system as just set forth, which comprises a means actuated by said volume measuring means for advancing said time controlled means independently of time in order that the said three-way valves may be actuated after a predetermined volume of test fluid has been measured, even though said time interval has not yet passed.

Once more briefly, the invention concerns a time driven controller unit that has means for actuating a signal transducer at predetermined intervals. The invention concerns the combination that comprises a clutch means interposed in said time drive, and a means for driving said actuating means in response to another condition whereby said signal transducer will be actuated at said predetermined time intervals unless said other condition takes precedence thereover.

The foregoing and other objects and benefits of the invention will be more fully appreciated in connection with a specific illustrative embodiment thereof that is set forth below, and that is illustrated in the drawings, wherein:

The drawing figure illustrates schematically a system for testing a plurality of wells in sequence.

Referring to the figure of the drawings, it is pointed out that there is schematically shown a well test system which provides for testing the flow from a plurality of wells in a given locality. Thus, for the purpose of illustration, there is shown a group of four "well" lines 11, 12, 13 and 14, each of which are connected to carry the output fluid from an individual well (not shown) in a given oil well field. It will be appreciated that there might be any given number of wells thus connected for testing, and the use of only four lines 11–14 is merely an arbitrary number for the purposes of illustration.

As the production fluid flows from these wells, it is all directed, with the exception of individually selected ones, to a production separator (indicated but not shown) via a flow line 17 that is connected to the output end of a manifold 18. The manifold 18 is connected to each of the individual well flow lines 11–14 by a connecting line 20, 21, 22 and 23 respectively, as controlled by a corresponding plurality of valves 24, 25, 26 and 27 in each case. The valves 24–27 are each a pneumatically actuated, three-way type as schematically indicated and they are biased to the position for connecting the respective flow line 11–14 to the corresponding connecting line 20–23 in the absence of any pneumatic control signal.

Thus, it will be observed that the three-way valves 24, 25, 26 and 27 are connected into controlling relation with each of the well flow lines 11–14 respectively. In the absence of any control signal (pressure), each of the three-way valves 24–27 will provide a connection from the corresponding will flow line 11–14 to the manifold 18 via the connecting line 20–23. Then, as any one of the three-way valves 24–27 is actuated (by reason of a pneumatic pressure signal being applied thereto), that valve will be switched over so as to close the connection from the corresponding flow line 11–14 to the manifold 18 and open a connection from that well flow line to the corresponding one of connecting lines 24', 25', 26' and 27' that leads to a second manifold 28. The output from manifold 28 leads, via a fluid pipe 29 to the input of a test separator 30.

The actuation of individual flow control valves 24–27 is carried out in sequence by application of pneumatic pressure signals to the individual valves, one at a time. These pressure signals may be applied in any feasible manner, e.g., that schematically illustrated. Thus, as indicated in the illustration there is a pneumatic pressure input pipe 33 that leads to a pneumatic distributor valve element 34, where the angular position of a rotatable valve element 35 will determine which of a plurality of output pneumatic pressure signal pipes 38, 39, 40 and 41, will be connected to the source of pneumatic pressure. Of course, the pressure is applied through the input pipe 33.

As schematically indicated, there is a pneumatic piston-operated motor 44 which acts to rotate drive wheel 45 of the distributor valve. The arrangement will be so designed that each time the motor 44 is actuated it will cause the drive wheel 45, and consequently the distributor valve element 35 to be rotated one step, so as to shift the connection from one to the next of the pressure pipes 38–41, for example. As indicated above, there may be any given number, more or less than the indicated four wells, which are connected to the system.

There is a time controller unit 48 that has an output which provides pneumatic signals periodically. These signals, which are in the form of pneumatic pressure pulses, are connected to the pneumatic motor 44 over a pneumatic circuit connection 49 that is schematically indicated by a dashed line in the drawing. The timing of such pressure pulses is determined by a clock drive unit 50 which has a time controlled output drive shaft 51 that connects the clock unit 50 to one side of a clutch 52.

Clutch 52 is schematically illustrated as being a friction, or slip type. However, it will be appreciated that it may take various other forms, e.g., a ratchet or the like (not shown) permitting override, or slipping action when the output side of the clutch is rotated forceably in the same direction as that determined by the time driven drive shaft 51. There is a time wheel 55 which is directly driven by the output side of the clutch 52, and which has two integrally related parts that are attached as a complete unit so that both parts rotate together at all times along with the output side of the clutch.

A time wheel unit in accordance with the invention might take various different forms, but a preferred embodiment has been schematically illustrated. It includes as parts of the time wheel element 55, three separate discs 58, 59 and 60. These discs are all securely attached together, with two cylindrical spacers 61 and 62 separating the three discs. The whole unit 55 is attached securely onto a supporting shaft 65 in any feasible manner, for non-slip rotation therewith. This positive coupling may be made by having a key and key-way (not shown) in connection with the mounting on the shaft 65, and by employing a threaded end for the shaft to receive a hexagonal nut 66 (as illustrated) for holding the entire unit onto the shaft 65.

The left hand portion (as viewed in the drawing) of the time wheel element 55 acts as the time control element. It produces time signals from a pneumatic signal transducer 69 whenever a control arm 70 is contacted and caused to move with a swinging movement or in a vertically reciprocating manner. Such movement is caused by contact with the lower extremity the arm 70 of one of a number of pins 71 that may be inserted at any desired intervals around the periphery of the time section (above spacer 61) of unit 55. The pins 71 are proper size for insertion into any desired ones of a series of holes 72 that pass through the disc 58 and are aligned with corresponding holes in the middle disc 59.

As the time unit 50 drives the discs 58, 59 and 60 in rotation at a predetermined time speed, the pins 71 will be carried through a path that will bring each of them successively into contact with the lower end of the arm 70. Arm 70 will thus be caused to swing or reciprocate, depending upon the structural details of the transducer 69. Such movement of the arm 70 will, in turn, actuate a pneumatic valve (not shown) of the transducer unit 69 so as to permit pneumatic pressure (as introduced at a pneumatic input connection 75) to be transmitted over the pneumatic circuit 49 indicated. This pneumatic pressure (signal) will energize the motor 44 so as to cause actuation of the distributor valve 34 that determines the sequential positioning of the flow line control valves 24–27, as already described above. It will be understood that each time the motor 44 is energized, it will act by means of the ratchet drive wheel 45 to move the rotor valve element 35 one step in order to shift the output connection from one to the next of the pneumatic pipes 38–41, etc.

At the same time, the whole time wheel element 55 also may be rotated, irrespective of the time drive input described above. Thus, whenever a measured quantity has been produced from whichever one of the wells is then connected to the test separator 30, it will cause a step of rotation of the wheel 55 to take place. Such step rotation of the time wheel element is carried out by means of a pneumatic diaphragm type motor 78. Motor 78 acts in conjunction with the right hand side (as viewed in the drawing) of the time wheel element 55. There is a pivoted pawl 79 carried on the end of a reciprocable shaft 80 which is actuated by the diaphragm controlled elements (not shown) in the motor 78.

It will be clear that the arrangement of diaphragm motor 78 and its reciprocating output shaft 80 plus pivoted pawl arm 79, acting together with a plurality of pins 83 on the step-drive side of the time wheel unit 55, will provide a ratchet action in a step-wise manner to rotate discs 59 and 60 along with the entire time wheel element 55, through the angular distance of one step. The angular distance of each step is determined by the angle between each successive pair of the pins 83, because whenever diaphragm motor 78 completes a cycle the reciprocating shaft 80 will be extended and then retracted again so as to cause the latch structure, at the end of pawl 79 to act in conjunction with the next pin 83 and so rotate unit 55 a predetermined angular distance.

Actuation of the diaphragm motor 78 takes place under control of a measured quantity of fluid flowing from the connected one of the wells in the system. This is determined by the measurement of a given volume of such fluid in the lower portion of the test separator 30. The measurement is accomplished by having the separator 30 divided so that the lower half is a volume measuring chamber 84. It has a float 85 therein that is pivoted from one side of the tank (as schematically indicated) and there is a mechanical connection 86 (of any feasible sort) from the float to a pilot valve unit 87 for controlling the latter. The arrangement for actuation of the pilot valve unit 87 will be set so as to take place at predetermined levels of the fluid in the measuring chamber portion 84 of separator 30. Consequently, as fluid from the connected well flows from the upper separator section of test separator 30, it will pass through a pipe 90 that leads to a pneumatically actuated normally-open valve 91. At the same time, a similar but normally-closed valve 93 will be standing in its closed position and this situation will remain until the fluid within the measuring chamber 84 has reached a predetermined level (as indicated) when the float 86 will actuate the pilot valve unit 87. Such actuation of the pilot valve unit will cause or permit a pneumatic pressure signal to be introduced and carried over a pneumatic circuit 92 to actuate both of the valves 91 and 93, closed and opened respectively at the same time. Simultaneously, with the actuation of valves 91 and 93, a pneumatic pressure signal will be carried over a branch circuit 97 which leads to the diaphragm motor 78.

It will be appreciated that the details of the structure and arrangement of the various units and elements might be reversed without changing the principles involved, e.g., the diaphragm motor 78 might rotate the wheel 55 upon receipt of a pressure signal, or as illustrated the wheel may be rotated by the return spring action of motor 78 after the pressure signal has been dissipated.

As soon as the measured quantity of fluid has been allowed to flow out via a pipe 94 that is connected to the other side of the outlet valve 93 from that adjacent to the measuring chamber 84, the float 85 will reach its low level position (fluid level indicated by lower dashed line) and the pilot valve unit 87 will be actuated by the mechanical connection 86 to cut off the pressure signal and exhaust the pneumatic circuits 92 and 97. At this time the valves 91 and 93 will return to their normal positions so that valve 91 is open and valve 93 is closed. Consequently, the fluid flowing from the upper half of test separator 30 will now pass through pipe 90 and valve 91 and will flow into the chamber 84 of the tank and fill same while raising the float 86 until the full level is reached once more. Thus, each time the measuring chamber 84 has been filled and emptied there will be a one stroke action of the diaphragm motor 78, which will result in the rapid rotation of time wheel element 55 through at least a portion of a given angular distance, the distance being determined by the spacing between pins 83.

It is to be noted that for proper operation, the length of the stroke of the shaft 80 must be fixed in order that only a given maximum rotation of the wheel will be caused for each stroke.

It will be appreciated by anyone skilled in the art that a system in accordance with the invention might be constructed employing electrical instead of pneumatic elements. For example, instead of a diaphragm motor 78, there might be a solenoid actuated motor (not shown) and the valves 91 and 93 might be electrically operated, etc.

*Operation*

Although an embodiment of the invention has been illustrated in connection with a well test system, it will be apparent to anyone skilled in the art that it may have other applications as well. Furthermore, since the illustrated application relates to an oil well testing system which was already known, the various elements of the system are shown in a schematic manner only.

Beginning with the connections from each of a plurality of well flow lines 11–14, the paths of fluid flow and the control thereof may be followed with reference to the schematic showing for an illustrative system. Thus, under illustrated conditions, the flow line 11 is connected to the manifold 28 via the connecting line 24' while the manifold 18 is disconnected since the valve 24 is energized. This is by reason of the valve 24 having a pneumatic pressure signal being applied to the diaphragm actuator thereof via pneumatic pipe 38. All of the remaining flow lines, e.g., 12, 13 and 14, are connected to the manifold 18 (which leads to production separator flow line 17) because each of the diaphragm actuators for valves 25, 26 and 27 are open to exhaust, at the distributing valve 34.

Production fluid flowing from the well connected to line 11 will be flowing into manifold 28 and then through pipe 29 into test separator 30. In the separator section at the top of test separator 30, the production fluid will accumulate while the gas is allowed to pass off through the gas outlet shown. The accumulated liquid will flow through the pipe 90 and via open valve 91 into the volume measuring chamber 84 through interconnecting pipes 98 and 99. It will be recalled that the valve 93 is closed when valve 91 is open so that all of this liquid goes into chamber 84 until the level of liquid therein reaches a predetermined high point as indicated by the position of the float 85. When that predetermined level has been reached, the pilot valve unit 87 will be actuated. Actuation of unit 87 will open a pneumatic pressure connection through from the inlet connection schematically indicated and on via pneumatic circuit 92, and parallel connected pneumatic circuit 97, to the pneumatic operators for each of the valves 91 and 93 as well as to the diaphragm motor 78. The pneumatic pressure signals thus applied via the indicated connections will then cause valve 91 to be closed and valve 93 to be opened, while at the same time the diaphragm actuator of motor 78 will cause the piston 80 to be extended.

After the above quantity measurement has taken place, the fluid in the measuring chamber 84 of separator 30 will flow out through the valve 93 until a predetermined low level of fluid is reached. At such low level, float 85 will cause pilot valve unit 87 to be switched off by means of the adjustment of the mechanical connection 86. The result is a cutting off of the pneumatic pressure input signals and a connection of the pneumatic circuits 92 and 97 to exhaust. This will then return valves 91 and 93 to their former state so that valve 91 is opened while valve 93 is closed and diaphragm motor 78 will return the shaft 80, under spring bias, to its rest position. During this return action of shaft 80 (by reason of the latch structure at the free end of the pawl 79) the time wheel element 55 will be rotated through the remainder of a given angular distance not already covered by time drive rotation caused by the clock drive unit 50.

It will be appreciated that the return spring (or other bias) of the diaphragm motor 78 will be strong enough to rotate the wheel 55 while slipping the clutch 52. On the other hand if it is preferred to have the wheel rotated when the shaft 80 is being extended, then appropriate modification might be made.

In the absence of the arrangement illustrated, i.e., with metering tank 30 and related elements, the time controlled signal transducer 69 would provide for switching the distributor valve 34 at predetermined time intervals only. These time intervals may be set by placing the pins 71 (in the time portion of element 55) so that after given time intervals the time wheel unit 55 will have rotated until a pin 71 has contacted the control arm 70 of the transducer 69. Thus, as already explained above in connection with the description of the elements in the system, a pressure signal would be provided by admitting pneumatic pressure as introduced through the input pipe 75. Such pressure signal would pass over the pneumatic circuit connection 49 to the piston motor 44 which would then cause its shaft to be extended and thus in turn cause the drive wheel 45 of distributing valve 34 to be rotated one step. The final result would be to cause the next valve, e.g., 24–27, to be actuated while the previous valve would be returned to its former state. Consequently, the time controlled shifting of the flow line connection in sequence, will continue upon a time basis so long as the clock drive unit 50 continues in operation. This will continue irrespective of the flow controlled action which takes place as each well flow line is individually connected to the test separator unit 30.

In accordance with the foregoing, if any of the wells are flowing at or below the minimum quantity of fluid flow, it will be the predetermined set time that will determine when that well is shifted from its connection to the test manifold 28 back to the production manifold 18. On the other hand, where a well is flowing at a higher rate, the action is such that the control unit need not wait for the full time interval. The latter is because the time wheel unit 55 will be advanced (by diaphragm motor 78) in accordance with the measured flow of output from the well, and the higher the rate of measured flow the less time will be needed before the next signal is provided to switch the connection from one valve to the next in the sequence.

It will be appreciated that this invention provides for improved efficiency since in most fields the variation in rate of flow is quite great from one well to the next. And, in order to be able to obtain sufficient testing of the low flow wells, there was previously great loss of time and unnecessary by-passing of production fluid when the high flow wells were under test.

Furthermore, a difficulty that has been overcome related to the sampling of the production fluid from the well under test. When the individual well testing was done on a time control only (prior to this invention), the pumping or drawing off of a sample would tend to overflow the sample bottle making a hazardous and messy waste. Now with this invention employed there is a predetermined maximum quantity of test flow, and consequently the pumping of the sample that is drawn off may be set at a rate that will just fill the sample container without overflow.

It will be appreciated that the principles of this invention need not necessarily be applied to oil field testing only, but they may have many and other and wider applications. Also it will be noted that various types of structural elements may be employed throughout the system illustrated, and the details of such structure form no part per se of this invention.

While a particular embodiment of this invention has been illustrated and described in considerable detail in accordance with the applicable statutes, this is not to be taken as in any way limiting the invention but merely as being descriptive thereof.

I claim:

1. In combination with a semi-automatic well testing system comprising a plurality of flow lines for carrying production fluids from a plurality of wells corresponding thereto, a first manifold for carrying said fluids to a production separator, a second manifold for carrying said fluids to a test separator, volume measuring means for the test fluid from said second manifold, a plurality of three-way valves corresponding to said flow lines for alternatively connecting each flow line to said first or said second manifold, and time controlled means for actuating said three-way valves in sequence after a predetermined fixed time interval, the improvement comprising means actuated by said volume measuring means for affecting said time controlled means independently of time whereby said three-way valves may be actuated after a predetermined volume of test fluid has been measured even though said time interval has not yet passed.

2. In combination with a semi-automatic well testing system according to claim 1, the improvement comprising
    (a) said volume measuring means including a chamber having predetermined volume,
    (b) means for detecting measurement of said predetermined volume of test fluid in said chamber, and
    (c) means controlled by said detecting means for affecting said time controlled means independently of time whereby said three-way valves may be actuated after a predetermined volume of test fluid has been measured even though said time interval has not yet passed.

3. In combination with a semi-automatic well testing system according to claim 1, the improvement comprising
    (a) said volume measuring means including a chamber having a predetermined volume,
    (b) said time controlled means including a time wheel, a clock drive for rotating said wheel, and a clutch interposed between said clock drive and said wheel,
    (c) means for detecting measurement of said predetermined volume of test fluid in said chamber, and
    (d) means actuated by said detecting means for advancing said time wheel a predetermined amount whereby said time controlled means may actuate the three-way valves at intervals of less than the predetermined fixed time if a predetermined number of test volumes have been measured.

4. In combination with a semi-automatic well testing system according to claim 1, the improvement comprising
    (a) said volume measuring means including a chamber, means for sensing the level of test fluid in said chamber, and valve means for controlling filling and draining of said chamber,
    (b) said time controlled means including a time wheel, a clock drive for rotating said wheel, and a clutch interposed between said clock drive and said wheel,
    (c) advancing means for rotating said time wheel independently of said clock drive, and
    (d) means responsive to said level sensing means for controlling actuation of said advancing means for the time wheel, and actuation of said valve means.

5. In combination with a semi-automatic well testing system according to claim 1, the improvement comprising
    (a) said volume measuring means including a chamber, means for sensing the level of test fluid in said chamber, pneumatically actuated valve means for controlling filling and draining of said chamber, and a pneumatic pilot valve actuated by said sensing means for controlling actuation of said fill and drain valve means,
    (b) said time controlled means including a time wheel, a pneumatic signal transducer, adjustable means on said time wheel for actuating said signal transducer at predetermined intervals of time, a volume wheel integrally attached to said time wheel for simultaneous rotation therewith at all times, a diaphragm motor having a pawl, ratchet means on said volume wheel for cooperating with said pawl to provide for a predetermined rotation of said wheels upon actuation of said diaphragm motor, a clock drive for rotating said wheels, a clutch interposed between said clock drive and said wheel to permit rotation of both wheels when said diaphragm motor is actuated so that a predetermined volume of test fluid will cause actuation of said transducer actuating means, and pneumatic motor means for controlling sequential actuation of said three-way valves, and
    (c) pneumatic circuit means including means for introducing pneumatic pressure to said circuits, means for connecting said pneumatic pilot valve to said diaphragm motor and to said fill and drain valve means for simultaneous actuation thereof, and means for connecting said signal transducer to said pneumatic motor means.

6. In semi-automatic well testing wherein a plurality of producing wells are connected so as to provide for testing the production of individual wells in a predetermined sequence, the combination comprising
    (a) a signal transducer for providing control signals to determine actuation of said sequential connections,
    (b) a time wheel having adjustable means for periodically tripping said signal transducer to provide said control signals,
    (c) a time drive input coupling for rotating said wheel,
    (d) a clutch in said input coupling for permitting overriding rotation of said wheel,
    (e) cyclic drive means actuated upon the measurement of a predetermined quantity of the production of a well under test for providing override rotation of said wheel, and
    (f) means carried by said wheel for cooperating with said cyclic drive means to determine the amount of override rotation imparted by each cycle thereof.

7. In combination, a signal transducer, a time wheel having two sections integrally attached to one another, a first plurality of pins located near the periphery of one section of the wheel, said signal transducer including an arm extending into the path of said pins for tripping said transducer periodically, a time drive input coupling for rotating said wheel, a clutch in said input coupling for permitting overriding rotation of said wheel, and cyclic drive means for providing override rotation of said wheel and comprising a second plurality of pins located near the periphery of said other section of the the wheel, said cyclic drive means also comprising a reciprocable member having a pawl thereon for engaging said last named pins.

References Cited by the Examiner

UNITED STATES PATENTS

| 2,736,201 | 2/1956 | Ohlsen et al. | 73—198 X |
| 3,125,695 | 3/1964 | Searle | 74—3.54 X |

JAMES J. GILL, *Acting Primary Examiner.*

RICHARD C. QUEISSER, *Examiner.*

J. W. MYRACLE, *Assistant Examiner.*